United States Patent
Hung et al.

(10) Patent No.: US 8,890,844 B2
(45) Date of Patent: Nov. 18, 2014

(54) OPTICAL NAVIGATION APPARATUS

(75) Inventors: Wai Hung, Hong Kong (CN); Francis Guillen Gamboa, Hong Kong (CN); Xiaoming Yu, Hong Kong (CN)

(73) Assignee: SAE Magnetics (H.K.) Ltd., Hong Kong (CN)

( * ) Notice: Subject to any disclaimer, the term of this patent is extended or adjusted under 35 U.S.C. 154(b) by 426 days.

(21) Appl. No.: 12/926,848

(22) Filed: Dec. 13, 2010

(65) Prior Publication Data

US 2011/0298715 A1 Dec. 8, 2011

Related U.S. Application Data

(60) Provisional application No. 61/344,177, filed on Jun. 4, 2010.

(51) Int. Cl.
*G06F 3/03* (2006.01)
*G06F 3/0354* (2013.01)
*G06F 3/042* (2006.01)

(52) U.S. Cl.
CPC ............ *G06F 3/03547* (2013.01); *G06F 3/042* (2013.01)
USPC .......................................... 345/175; 345/166

(58) Field of Classification Search
USPC ......................................................... 345/166
See application file for complete search history.

(56) References Cited

U.S. PATENT DOCUMENTS

| | | | | |
|---|---|---|---|---|
| 6,488,397 B1* | 12/2002 | Masutani et al. | ............. | 362/551 |
| 6,809,723 B2* | 10/2004 | Davis | ............. | 345/166 |
| 7,282,694 B2* | 10/2007 | Lee et al. | ............. | 250/221 |
| 7,825,895 B2* | 11/2010 | Bynum et al. | ............. | 345/156 |
| 8,711,097 B2* | 4/2014 | Westerweck et al. | ............. | 345/166 |
| 2005/0248540 A1* | 11/2005 | Newton | ............. | 345/173 |
| 2006/0244722 A1* | 11/2006 | Gust | ............. | 345/156 |
| 2006/0289727 A1* | 12/2006 | Bricaud et al. | ............. | 250/221 |
| 2007/0164975 A1* | 7/2007 | Lim et al. | ............. | 345/102 |
| 2009/0160769 A1* | 6/2009 | Lowles et al. | ............. | 345/160 |

* cited by examiner

*Primary Examiner* — Joseph Haley
(74) *Attorney, Agent, or Firm* — Nixon & Vanderhye PC

(57) ABSTRACT

An optical navigation apparatus comprises a substrate with a sensor integrated circuit and an infrared source formed thereon; a sensor cover shielding the sensor integrated circuit and the infrared source; at least one visible light source formed outside the sensor cover and electrically connected with the substrate; a light guide located outside the sensor cover and covering the visible light source; and an outer housing covering the light guide and the substrate, and the outer housing comprises an infrared window and a side wall capable of guiding visible light towards and illuminating a region of the outer housing. In such an arrangement, the outer housing of the present invention is not only used as a casing for protection, but also served as light guide and distribution structure to reflect and re-distribute light sufficiently to achieve a uniform illuminated character shape.

19 Claims, 4 Drawing Sheets

OPTICAL NAVIGATION APPARATUS

This application claims the benefit of Provisional Application No. 61/344,177, filed 4 Jun. 2010, the entire content of which is hereby incorporated by reference in this application.

FIELD OF THE INVENTION

The present invention relates to an optical navigation apparatus, and more particularly, to an optical navigation apparatus with an outer housing that can be illuminate with internal light source.

BACKGROUND OF THE INVENTION

Optical navigation apparatus are used in portable electronic appliances as a user input device for graphic user interface (GUI) control. Optical navigation apparatus operates by registering relative movement between the optical navigation apparatus and a target sensing surface in close proximity to the sensing area of the apparatus and convert the movement information into electronic format accessible by external system. An optical navigation apparatus uses a light source, such as a light emitting diode (LED) or laser to illuminate user's finger and a sensor to capture reflected light off the target surface. The control logic within the optical navigation apparatus compares consecutive changes in reflected light pattern and estimates the relative movements between the optical navigation apparatus and the target surface based on the comparison. Typical optical navigation apparatus output two-dimensional movement information that represents the two-dimensional movement of the finger relative to the sensor array. The two-dimensional movement information is then used to move a cursor on a display of a corresponding computing device.

Optical navigation apparatus can be used to move a cursor on a display and the graphical user interface of many computing devices, such as personal computer, telephone, smart phones, and personal digital assistants (PDA). For example, the optical navigation apparatus is commonly used as the main navigation button on a mobile phone. As the user finger moves on the apparatus surface, the motion is tracked and the movement is reflected in the cursor movement on the display screen of the phone.

A traditional optical navigation apparatus includes an outer housing, an infrared source and a sensor array positioned in close proximity. The sensor array and the infrared source are mounted on a substrate, e.g. a printed circuit board. The infrared light source is formed within the outer housing to illuminate the target surface on which finger motion are performed. Commonly, the optical navigation apparatus may further includes a light guide for guiding infrared light to illuminate the target surface. Since the sensors in the optical navigation apparatus are often sensitive to both visible light and infrared, the outer housing of the apparatus is made of infrared-transparent that blocks visible light transmission to prevent light interference from the surroundings.

On the other hand, it is common for portable electronic appliance to have user input keys that are illuminated on the front-facing surface to facilitate operation in low-light environment. For better visual effect, the illumination pattern need to have high uniformity and clearly defined character shape. With the previous apparatus design, it is not possible to achieve this illumination effect as visible light is blocked from transmission through the outer housing walls. Hence, it is desired to provide an improved optical navigation apparatus to overcome the above-mentioned drawbacks.

SUMMARY OF THE INVENTION

One aspect of the present invention is to realize an optical navigation apparatus with a part of its outer housing uniformly illuminated to form a clearly illuminated character shape on the outer housing to enhance the cosmetic effect and allow the navigation apparatus to be recognized and used under low-light environment.

To achieve the above objective, an optical navigation apparatus comprises a substrate with a sensor integrated circuit and an infrared source formed thereon; a sensor cover shielding the sensor integrated circuit and the infrared source; at least one visible light source formed outside the sensor cover and electrically connected with the substrate; a light guide located outside the sensor cover and covering the visible light source; and an outer housing covering the light guide and the substrate, and the outer housing comprises an infrared window and a side wall capable of guiding visible light towards and illuminating a region of the outer housing.

Preferably, the visible light source is formed on the sensor cover and within the confinement of light guide.

Preferably, the sensor cover has a first aperture formed thereon.

Accordingly, the light guide has a second aperture corresponding to the first aperture to allow the infrared light to pass through.

More preferably, the light guide has at least one recessed cavity for embedding the visible light source.

Preferably, the light guide is made of transparent light guiding material, and two reflectors are formed on top and bottom surfaces of the light guide. More preferably, the light guide further comprises a plurality of micro-structures to distribute the light uniformly.

As an exemplary embodiment, the side wall of the outer housing is infused with light scattering micro-particles.

Preferably, the light scattering micro-particles are $TiO_2$.

More preferably, a white reflective coating covers on the outer surface of the side wall.

As another embodiment, the outer housing comprises an upper portion and a lower portion.

Preferably, a connection interface is formed between the upper portion and the lower portion, which is capable to reflect light. More preferably, the connection interface is an inclined plane.

As an optional embodiment, the visible light is electrically connected with the substrate via a flexible printed circuit.

As another optional embodiment, a tactile switch is formed at the bottom of the substrate.

We further describe a system comprising a handheld computing device and a user input device coupled to the handheld computing device for receiving user input. The user input device comprises an optical navigation apparatus that comprising a substrate with a sensor integrated circuit and an infrared source formed thereon; a sensor cover shielding the sensor integrated circuit and the infrared source; at least one visible light source formed outside the sensor cover and electrically connected with the substrate; a light guide located outside the sensor cover and covering the visible light source; and an outer housing covering the light guide and the substrate, and the outer housing comprises an infrared window and a side wall capable of guiding visible light towards and illuminating a region of the outer housing.

Preferably, the handheld computing device comprises a mobile telephone handset.

In comparison with the prior art, the optical navigation apparatus of the present invention has not only a light guide for guiding the visible light to the rim of the outer housing, but also an outer housing that is multi-function. The outer housing of the present invention is not only used as a protective casing to facilitate infrared signal propagation, but also served as a secondary light-guiding and distribution structure to reflect and re-distribute visible light sufficiently to achieve a uniform illuminated character shape. The visible light coupled into the side wall of the housing can be sufficiently scattered, and the light distribution can be uniform and even to reach the ring of the outer housing for illumination.

Other aspects, features, and advantages of this invention will become apparent from the following detailed description when taken in conjunction with the accompanying drawings, which are a part of this disclosure and which illustrate, by way of example, principles of this invention.

BRIEF DESCRIPTION OF THE DRAWINGS

The accompanying drawings facilitate understanding of the various embodiments of this invention. In such drawings.

DETAILED DESCRIPTION OF ILLUSTRATED EMBODIMENTS

Figure 1:
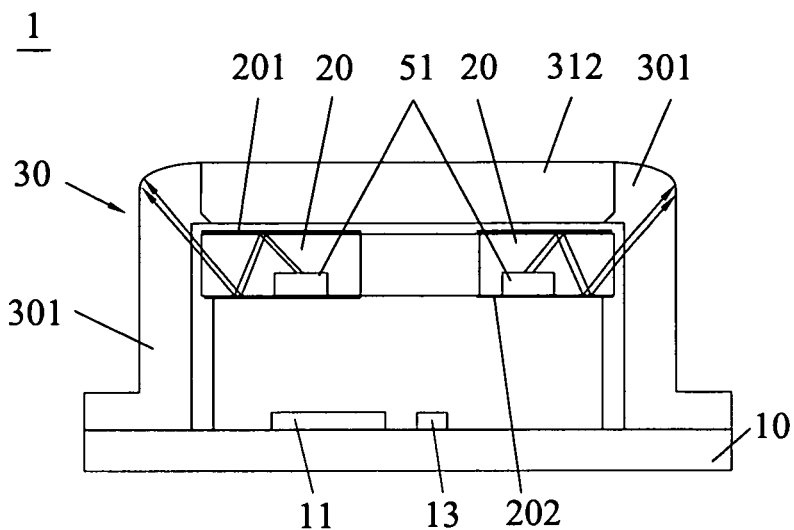
FIG. 1 is a structure view of an optical navigation apparatus according to a first embodiment of the present invention.

Various preferred embodiments of the invention will now be described with reference to the figures, wherein like reference numerals designate similar parts throughout the various views. The invention is directed to an optical navigation apparatus used in finger motion recognition system, as an instruction input port, wherein the apparatus is capable of generating internal illumination using a plurality of internal visible light source, an internal light-guiding element and an outer housing with a side wall capable of guiding visible light and light-reflecting coating outside the side wall. In such an arrangement, the outer housing of the present invention is not only used as a casing for protection, but also served as a light guiding structure to reflect and re-distribute visible light sufficiently. The visible light generated by the internal visible light source can be scattered adequately via here, and the light distribution can be uniform and even to reach the ring of the outer housing for illumination.

Figure 2:
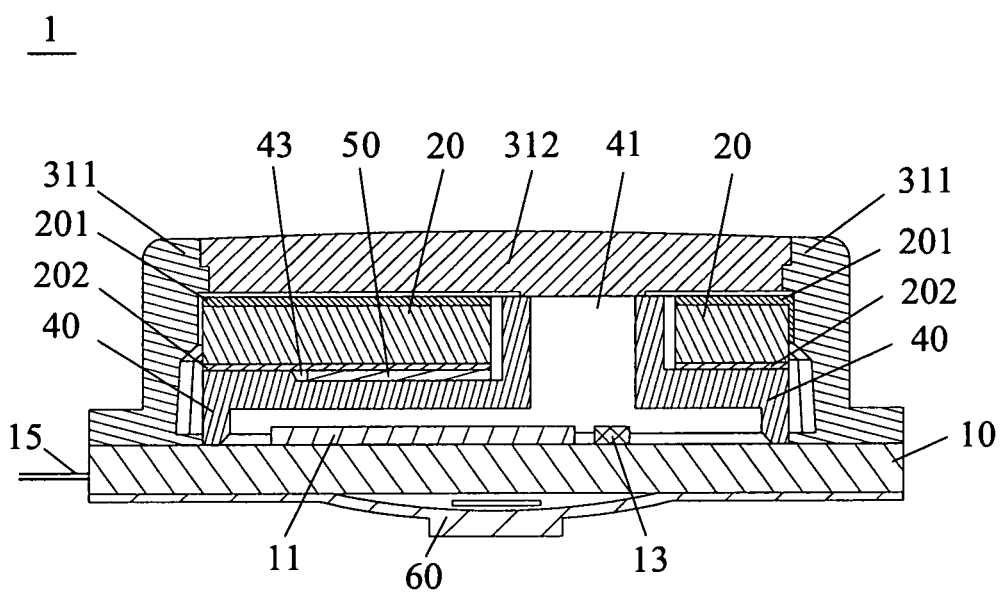
FIG. 2 is a sectional view of an optical navigation apparatus according to the first embodiment of the present invention.
Figure 3:
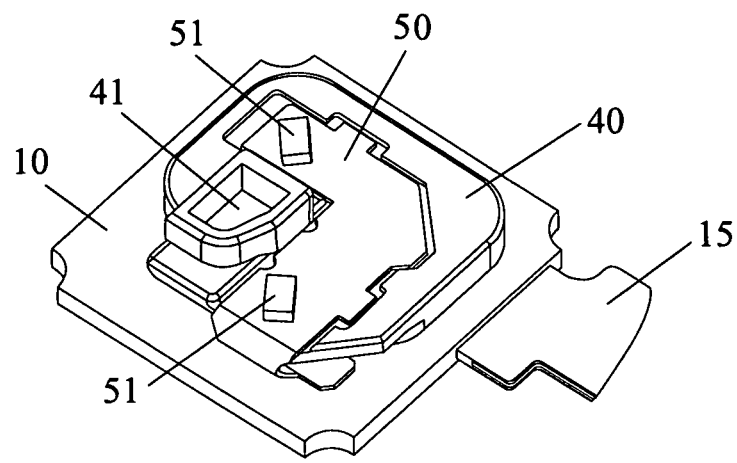
FIG. 3 shows a partial perspective view of the optical navigation apparatus shown in FIG. 2.

FIGS. 1-3 show an optical navigation apparatus 1 according to a first embodiment of the present invention. As illustrated in FIGS. 1-3, the Optical navigation apparatus 1 includes a substrate 10, light guide 20 located above the substrate 10, and an outer housing 30 covering the light guide 20.

Concretely, the substrate 10 is a printed circuit board which has an interior circuit region and an outer housing periphery mounting region. More concretely, the interior region has a sensor IC 11 and an infrared source 13 formed thereon. In detail, a sensor array (not shown), which is composed of a plurality of infrared-sensitive photodetectors is located on the top side of the sensor IC 11, and is adapted for sensing the variety of received infrared light. The sensor array is preferably fabricated monolithically as part of the sensor IC 11. The sensor IC 11 also includes a motion detection circuitry electrically connected to the sensor array. And the sensor IC 11 is electrically connected to the infrared source 13 to provide driving current to control the amount of infrared light generated by the source 13 to perform finger tracking function. The sensor IC 11 is connected to external circuitries (not shown) by a flexible printed-circuit 15.

Preferably, a sensor cover 40 is formed on the substrate 10 for protecting the sensor IC 11 and infrared source 13. The sensor cover 40 has a top surface facing to the light guide 20 and a bottom surface attached to the substrate 10. To allow the infrared light to transmit from the infrared source 13 to the top surface of the IR window 312 and to allow the reflected signal with finger movement information to be received by the sensor 11, a first aperture 41 is formed through the top surface, at the position corresponding to the position of the infrared source 13 and the sensor 11 on the substrate 10. Concretely, the first aperture 41 has a periphery wall protruding from the top surface forming an enclosed chimney for passing infrared signal. Optionally, imaging optics may be located within the chimney to assist forming of infrared light patterns on the sensor array to facilitate generation of navigation signal. Additionally, the top surface has a groove 43 formed thereof for engaging with the undermentioned LED device.

As mentioned, the optical navigation apparatus 1 further comprises one or more light emitting diode (LED) devices serving as the visible light source for emitting visible light for illumination. In one embodiment according to the present invention, two LED devices are disposed on the top surface of the sensor cover 40. In detail, the LED devices are electrically connected and located on a LED flexible printed circuit 50 which is extended from the substrate 10 and fit into the groove 43 on top of the sensor cover 40. More concretely, there are flexible metal traces on the LED flexible printed circuit 50 which connects the LED devices to the substrate 10 from which an electrical power source provide the current needed to drive the LED devices 51.

Alternatively, the LEDs device can be arranged other connection ways to ensure the electrical connection.

In this embodiment, when assembling the LED device 51 to the sensor cover 40 and the substrate 10, the thickness of the LED flexible printed circuit 50 is chosen in such a way that it matches the depth of the groove 43 of the sensor cover 40, so that, when assembled, the base of the LED devices 51 and the top surface of the sensor cover 40 are at the same level. The horizontal location of the LED devices on top of the sensor cover 40 is determined in conjunction with the design of the light guide 20 as detailed below.

As shown in FIGS. 1-3, the light guide 20 of the present embodiment can be arranged to square or other shapes corresponding to the outer housing 30 and the other elements' shape, and is made of transparent plastic material, for example. Preferably, the light guide 20 includes a second aperture (not shown) formed through the top and bottom surfaces, and two recessed cavities (not shown) formed within the body of the light guide 20 at the corresponding position of the LEDs 51. Concretely, the dimension of the second aperture is identical to that of the first aperture 41 substantially. That is, when the light guide 20 is assembled onto the sensor cover 40, the second aperture is aligned with the first aperture 41. More concretely, the second aperture encircles the periphery wall of the aperture 41. The two apertures form an unobstructed optical path for infrared light to pass through without blocking. The recessed cavities are adapted for accommodating the two LEDs 51. After assembly, the two LEDs 51 are completely enclosed by the recessed cavities, that is, the LEDs 51 are embedded into the recessed cavities. Light generated by the LEDs 51 are coupled into the light guide 20 and guided towards the surrounding side walls of the outer housing 30.

Furthermore, the body of the light guide 20 may includes a plurality of light scattering structures at various locations of the light guide body to distribute light generated by the LEDs 51 in such a way that the luminous intensity across the entire light exit region is uniform. In one embodiment according to the present invention, the light scattering structures can include several partial and full cut-through slots (not shown) in the light guide body.

More preferably, as shown in FIG. 2, two reflectors 201, 202 are placed on the top and bottom surfaces of the light guide 20 respectively. As a preferable embodiment, the reflectors 201, 202 are mirror-like reflective coatings. The mirror-like reflective coating reflects light back into the light guide by means of specular reflection, thus confining light within the light guide body. Alternatively, the color of the reflective coating can be diffusive white. As another embodiment, the reflectors 201, 202 are diffuse reflective structure for reflecting the light back to the light guide by means of diffuse reflection.

Figure 4:
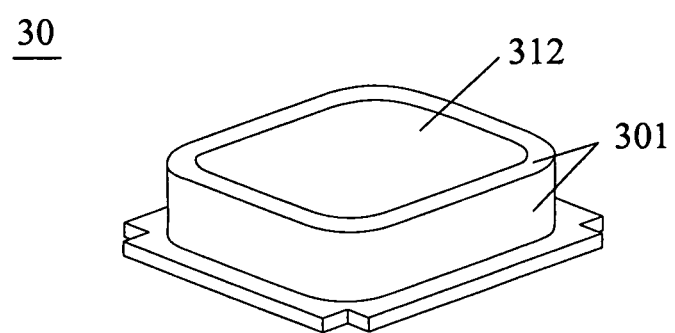
FIG. 4 shows a structure view of outer housing of the optical navigation apparatus according to the first embodiment of the present invention.

Referring to FIG. 4, the outer housing 30 of the present invention will be described as following. The outer housing 30 covers the light guide and the other elements, which is a unitary structure. As shown in FIG. 4, the outer housing 30 comprises an infrared window 312 and a side wall 301 surrounding the infrared window 312.

With the contemplation of the present invention, the side wall 301 is capable of guiding visible light towards a target illumination region of the outer housing 30. Concretely, the side wall 301 is made of translucent material with large bulk scattering. The translucent material can be fabricated by infusing transparent moldable plastic material with light-scattering micro-particles, TiO$_2$, for example. Preferably, a white reflective coating (not shown) is formed on the outer surface of the side wall 301, and a black non-reflective coating is formed on the white reflective coating in turn. In such an arrangement, the light emitting from the light guide 20 in the horizontal direction can be coupled into the side wall 301 and scattered further by the scattering particles to enhance the uniformity of light distribution. Light can exit to the exterior of the outer housing 30 only through areas without white and black coating. According to the current embodiment of the invention, the light is guided towards the top surface around the circumambience of the infrared window 312 for illumination.

By this token, the outer housing 30 is not only used as a casing for protection, but also can serve as a secondary light guiding structure to reflect and re-distribute light sufficiently. Light coming from the light guide 20 will be scattered adequately via here, and the light distribution can be uniform and even to reach the ring of the outer housing 30 for illumination.

Besides registering movement of user finger relative to the apparatus, the apparatus 1 can optionally further includes a tactile switch 60 formed at the bottom of the substrate 10. With this tactile switch 60, downward pressing action of user finger can be registered and utilized for portable electronic device user interface control.

Turning now to FIGS. 5-8, it shows an optical navigation apparatus 1' according to a second embodiment of the present invention. The structure of the optical navigation apparatus 1' is similar to that of the first embodiment roughly. The difference is the structure of the outer housing 30'.

Figure 7:
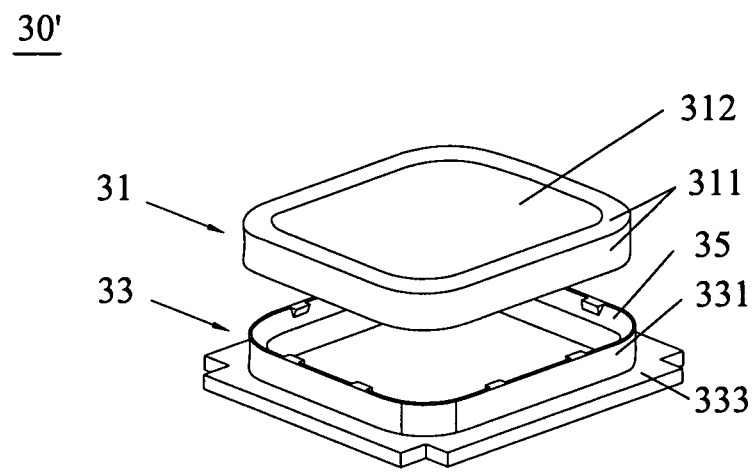
FIG. 7 shows an exploded view of an outer housing of the optical navigation apparatus according to the second embodiment of the present invention.
Figure 8:
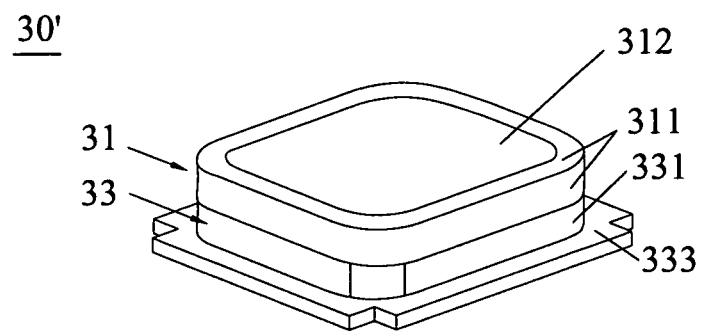
FIG. 8 is an assembly view of the outer housing shown in FIG. 7.

As illustrated in FIGS. 7-8, the outer housing 30' according to the present embodiment is separated and comprises an upper portion 31 and a lower portion 33 which are two separate parts and can be assembled with each other. Concretely, both the upper portion 31 and the lower portion 33 have an encompassing side wall, which is called upper side wall 311 and lower side wall 331 respectively. The upper portion 31 includes an infrared window 312 serving as an infrared sensing window, and this infrared window 312 is fabricated together with the upper side wall 311 in the manufacturing process to form the top surface of the upper portion 31. One process to form this upper housing 31 is by utilizing two-shot injection molding. The lower portion 33 is made of opaque material that does not guide visible light. The material used for fabricating lower portion 33 can, for example, be moldable plastic in black color. It further includes an encircled extension 333 connecting with the lower side wall 331. The encircled extension 333 and the lower side wall 331 can be molded together as a single piece or connected with each other by epoxy bonding, etc.

The upper portion 31 and the lower portion 33 can be assembled with each other by molding, epoxy bonding, ultrasonic bonding or any other means which are familiar to the people ordinarily skilled in the art. After the outer housing 30' is assemble completely, the upper portion 31 and the lower portion 33 forms a cavity adapted for covering the light guide 20 and the other elements, and the encircle extension 333 of the lower portion 33 is connected with the housing periphery mounting region of the substrate 10. Herein, an interface 35 is formed between the upper portion 31 and the lower portion 33, which is functional and will be described subsequently.

Figure 5:
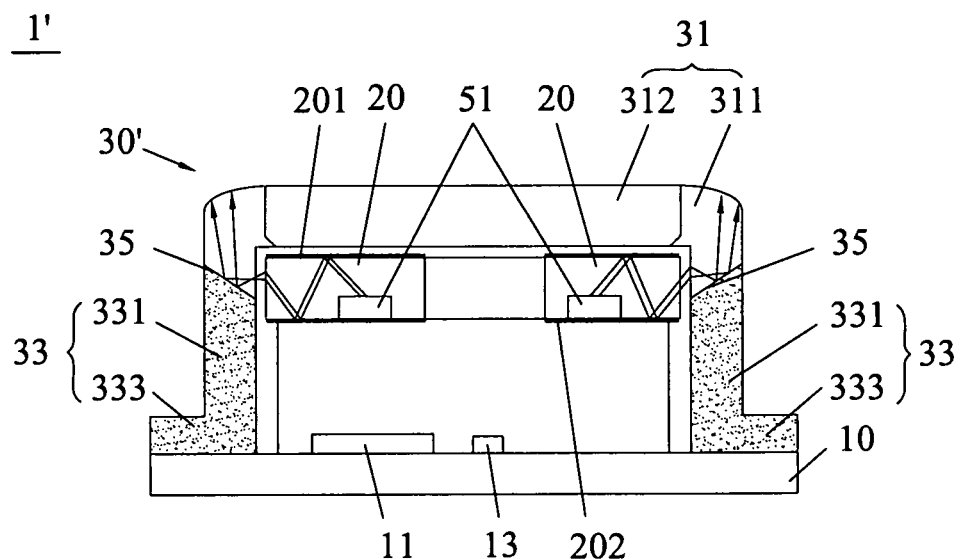
FIG. 5 shows an optical navigation apparatus according to a second embodiment of the present invention.
Figure 6:
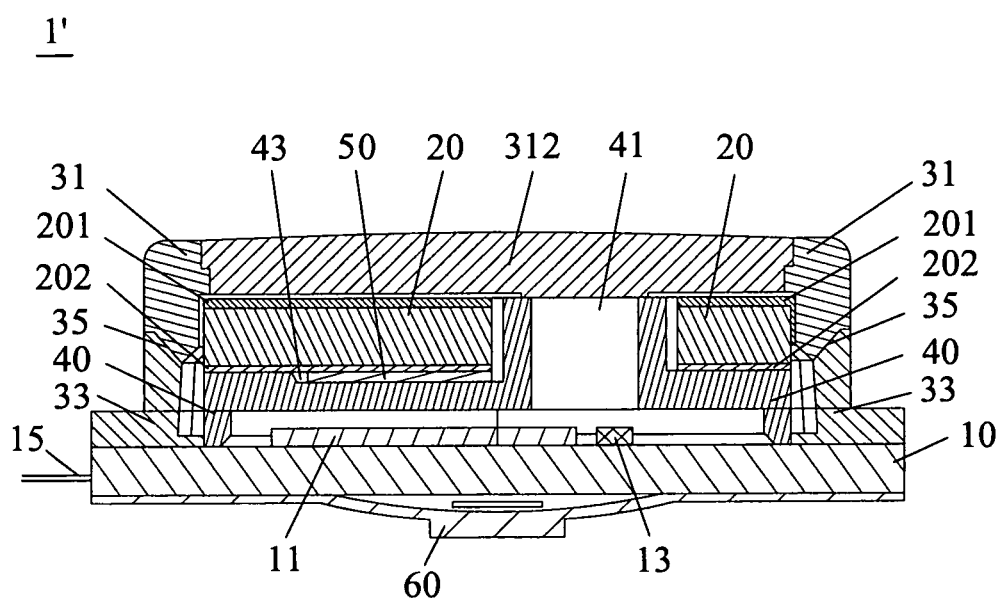
FIG. 6 is a sectional view of an optical navigation apparatus according to the second embodiment of the present invention.

With the contemplation of the present invention, the outer housing 30' is capable of guiding visible light towards a target illumination region. In the present invention, the upper side wall 311 is made of material transparent to visible light, and a reflective coating (not shown) is formed on the outer vertical surface of the upper side wall 311 to reflect the light emitted by the light guide 20. As shown in FIGS. 5 and 6, the interface 35 is an inclined plane which is also covered with a reflective coating (not shown) thereon. Preferably, the reflective coatings of the upper side wall 311 and the connecting interface 35 are scattering white reflective coatings. The interface 35 can also be designed to have other forms and orientations which are familiar to people ordinarily skilled in the art to facilitate guiding of visible light towards the desired illumination region. Alternatively, it also can be arranged that the reflective coating be other colors and textures as long as it can provide a high reflectivity. In this arrangement, the light entering the transparent upper portion 31 of the outer housing 30' can be confined within the apparatus by the reflective coatings and can only exit through the region without coating. Owing to the opaque feature of the lower portion 33, the visible light generated by LEDs 51 does not travel and leak away through this portion of outer housing 30'. As a result, the visible light is confined within a smaller region and a higher percentage of light can be utilized to illuminate the target region. Furthermore, the scattering nature of the reflective outer coating improves the uniformity of light distribution. In such an arrangement, the outer housing 30' is not only used as a casing for protection, but also served as another light guiding structure to reflect and re-distribute light sufficiently. Light coming from the light guide 20 will be scattered adequately via here, and the light distribution can be uniform and even to reach the ring of the outer housing 30' for illumination.

Preferably, a light-absorbing coating (not shown), preferably in black color, is painted outside the reflective coatings of upper side wall 311 in order to prevent light leakage from undesired areas on the apparatus surface.

Please turn to FIG. 1, 2 and FIG. 5, 6, the assemble process of the optical navigation apparatus 1 and 1' according to the invention generally includes the following steps. Firstly, assemble the sensor cover 40 on the substrate 10 having sensor IC 11, infrared source 13 and other elements, aligning the aperture with the infrared source 13 and sensor IC 11. Secondly, bond the LED flexible printed circuit 50 with the LED device 51 onto the bonding pads of the substrate 10, then mount the LED flexible printed circuit 50 onto the sensor cover 40 by matching it with the groove 43 of the sensor cover 40, and then mount the light guide 20 on top of the completed sensor cover and LED assembly by aligning the second aperture on the light guide with the chimney on the sensor cover 40 so that the LEDs 51 are embedded within the recessed cavities in the light guide 20. Finally, cover the above-mentioned element with the assembled outer housing 30 or 30', and connect the encircled extension 333 of the outer housing 30 or 30' to the housing periphery mounting region of the substrate 10. The assemble process hereto of the optical navigation apparatus 1 or 1' is finished.

While the optical navigation apparatus 1 or 1' operates, the infrared light generated from the infrared source 13 emits towards the outer surface of the infrared window 312 through the aperture. Without presence of external moving object in close proximity to the surface, there is little back reflection into the sensor array. When a user finger carries out movement on the outer surface of the infrared window 312, the intensity and spatial distribution of the reflected infrared light are varied with the motion of the finger. The sensor array receives the reflected infrared light with variation and converts such varying infrared light into the corresponding electrical signal. The sensor IC 11 samples the consecutive changes of the electrical signal and computes the relative input motion. The motion information can then be transmitted to external systems via the flexible printed-circuit 15. For the visible illumination part, the LEDs 51 sitting on the sensor cover 40 are powered through the flexible printed-circuit 15 by an external supply. The light generated is directly coupled into the light guide 20, and is confined within the light guide by the top and bottom reflector 201 and 202. The micro structures within the light guide serve the purpose of mixing and distributing light to give uniform output intensity at the light guide exit areas. Upon exiting from the light guide, the light is coupled into the side wall of outer housing 30 or 30' in which the light is scattered further by means described in previous sections, and finally the light exits the apparatus through the desired illumination areas around the circumambience of the infrared window 312. As a result, an illumination ring with uniform light intensity can be observed by users when the LEDs 51 are powered up.

The outer housing 30 and 30' of present invention not only serves as a protective apparatus casing, but also plays the role of facilitating motion tracking at infrared navigation region and guiding the illuminative visible light to create a uniform and clearly defined illumination ring.

The present invention also discloses a system comprising a handheld computing device and a user input device coupled to the handheld computing device for receiving user's input. Therein, the user input device comprises an optical navigation apparatus that contains all technical feature mentioned above.

As one embodiment, the handheld computing device comprises a mobile telephone handset.

Also, the optical navigation apparatus can apply within the PDA, remote control appliance, etc.

While the invention has been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the invention.

What is claimed is:

1. An optical navigation apparatus comprising:
a substrate;
a sensor integrated circuit arranged on the substrate;
an infrared source that emits infrared light arranged on the substrate;
at least one visible light source electrically connected to the substrate that emits visible light;
a light guide optically structured to guide the visible light; and
a sensor cover optically structured to block the visible light from contacting the sensor integrated circuit;
an outer housing covering and enclosing the light guide, the sensor cover and the substrate, and the outer housing comprising:
an infrared window optically structured to block non-infrared light; and a side wall optically structured to illuminate a region of the outer housing by guiding the visible light towards the region of the outer housing.

2. The optical navigation apparatus according to claim 1, wherein the visible light source is located on the sensor cover and confined by the light guide.

3. The optical navigation apparatus according to claim 1, wherein the sensor cover comprises a first aperture formed thereon.

4. The optical navigation apparatus according to claim 3, further comprising at least one optical element optically structured to guide the infrared light located within the sensor cover.

5. The optical navigation apparatus according to claim 3, wherein the light guide comprises a second aperture optically structured to allow the infrared light to pass through.

6. The optical navigation apparatus according to claim 5, wherein the light guide comprises at least one recessed cavity and the at least one visible light source is embedded in the at least one recessed cavity.

7. The optical navigation apparatus according to claim 1, wherein the light guide is made of or includes transparent plastic material.

8. The optical navigation apparatus according to claim 7, wherein the light guide comprises two reflectors arranged on top and bottom surfaces of the light guide.

9. The optical navigation apparatus according to claim 1, wherein the light guide comprises a plurality of physical structures optically configured to alter spatial distribution of light intensity and improve light intensity uniformity at the region of the outer housing.

10. The optical navigation apparatus according to claim 1, wherein the side wall of the outer housing is infused with light-scattering micro-particles.

11. The optical navigation apparatus according to claim 10, wherein the light-scattering micro-particles are $TiO_2$.

12. The optical navigation apparatus according to claim 10, wherein a white reflective coating covers an outer surface of the side wall.

13. The optical navigation apparatus according to claim 1, wherein the outer housing comprises an upper portion and a lower portion.

14. The optical navigation apparatus according to claim 13, wherein an interface is formed between the upper portion and the lower portion, which is optically configured to reflect the visible light.

15. The optical navigation apparatus according to claim 14, wherein the interface is oriented as an inclined plane.

16. The optical navigation apparatus according to claim 1, wherein the visible light sources are electrically connected to the substrate via a flexible printed circuit.

17. The optical navigation apparatus according to claim 1, wherein the apparatus further comprises a tactile switch formed at the bottom of the substrate.

18. A system comprising:
  a handheld computing device and a user input device coupled to the handheld computing device for receiving user input, the user input device comprising an optical navigation apparatus comprising:
    a substrate;
    a sensor integrated circuit arranged on the substrate;
    an infrared source that emits infrared light arranged on the substrate;
    at least one visible light source electrically connected to the substrate that emits visible light;
    a light guide optically structured to guide the visible light; and
    an outer housing covering and enclosing the light guide, the sensor cover and the substrate, and the outer housing comprising:
      an infrared window optically structured to block non-infrared light; and
      a side wall optically structured to illuminate a region of the outer housing by guiding the visible light towards the region of the outer housing.

19. The system according to claim 18, wherein the handheld computing device comprises a mobile telephone handset.

* * * * *